(12) United States Patent
Fujikata et al.

(10) Patent No.: US 8,936,962 B2
(45) Date of Patent: Jan. 20, 2015

(54) OPTICAL MODULATOR AND METHOD FOR MANUFACTURING SAME

(75) Inventors: Junichi Fujikata, Minato-ku (JP); Toshio Baba, Minato-ku (JP); Jun Ushida, Minato-ku (JP)

(73) Assignee: NEC Corporation, Tokyo (JP)

( * ) Notice: Subject to any disclaimer, the term of this patent is extended or adjusted under 35 U.S.C. 154(b) by 488 days.

(21) Appl. No.: 13/256,087

(22) PCT Filed: Feb. 15, 2010

(86) PCT No.: PCT/JP2010/052177
§ 371 (c)(1),
(2), (4) Date: Sep. 12, 2011

(87) PCT Pub. No.: WO2010/103891
PCT Pub. Date: Sep. 16, 2010

(65) Prior Publication Data
US 2012/0003767 A1    Jan. 5, 2012

(30) Foreign Application Priority Data

Mar. 13, 2009 (JP) ................................ 2009-061526

(51) Int. Cl.
| | | |
|---|---|---|
| H01L 27/15 | (2006.01) | |
| G02F 1/025 | (2006.01) | |
| G02F 1/225 | (2006.01) | |

(52) U.S. Cl.
CPC .............. *G02F 1/025* (2013.01); *G02F 1/2257* (2013.01)
USPC ........................................................ 438/79

(58) Field of Classification Search
None
See application file for complete search history.

(56) References Cited

U.S. PATENT DOCUMENTS

| | | | | |
|---|---|---|---|---|
| 4,855,186 A | * | 8/1989 | Grolig et al. .................. | 428/216 |
| 6,298,177 B1 | | 10/2001 | House | |
| 6,374,001 B1 | | 4/2002 | Bozeat et al. | |
| 7,034,981 B2 | * | 4/2006 | Makigaki ...................... | 359/290 |
| 7,132,691 B1 | * | 11/2006 | Tanabe et al. .................. | 257/79 |
| 2004/0184134 A1 | * | 9/2004 | Makigaki ...................... | 359/290 |
| 2004/0208454 A1 | * | 10/2004 | Montgomery et al. ......... | 385/50 |
| 2005/0094918 A1 | * | 5/2005 | Gunn, III .......................... | 385/8 |
| 2007/0147724 A1 | | 6/2007 | Ishizaka | |

FOREIGN PATENT DOCUMENTS

| | | | |
|---|---|---|---|
| JP | 59-180522 A | 10/1984 | |
| JP | 3-196120 A | 8/1991 | |

(Continued)

OTHER PUBLICATIONS

Cutolo et al., "An electrically controlled Bragg reflector integrated in a rib silicon on insulator waveguide," Appl. Phys. Lett., 1997, May 12, 1997, pp. 199-201, vol. 71 No. 2, American Institute of Physics.

*Primary Examiner* — Charles Garber
*Assistant Examiner* — Andre' C Stevenson
(74) *Attorney, Agent, or Firm* — Sughrue Mion, PLLC

(57) ABSTRACT

An optical modulator according to the present invention is configured at least by a semiconductor layer subjected to a doping process so as to exhibit a first conductivity type, and a semiconductor layer subjected to a doping process so as to exhibit a second conductivity type. Further, in the optical modulator, at least the first conductivity type semiconductor layer, a dielectric layer, the second conductivity type semiconductor layer, and a transparent electrode optically transparent in at least a near-infrared wavelength region are laminated in order.

14 Claims, 13 Drawing Sheets

(56) References Cited

FOREIGN PATENT DOCUMENTS

| | | | |
|---|---|---|---|
| JP | 2001-526797 A | 12/2001 | |
| JP | 2002-540469 A | 11/2002 | |
| JP | 2004-144886 A | 5/2004 | |
| JP | 2007-178550 A | * | 12/2005 |
| JP | 2006-515082 A | 5/2006 | |
| JP | 2007-178550 A | 7/2007 | |
| JP | 2007-525711 A | 9/2007 | |
| JP | 2008-281896 A | 11/2008 | |
| WO | 2007/091465 A1 | 8/2007 | |

* cited by examiner

Direction of propagation of light

Direction of propagation of light

Direction of propagation of light

Direction of propagation of light

OPTICAL MODULATOR AND METHOD FOR MANUFACTURING SAME

This application is a National Stage of International Application No. PCT/JP2010/052177filed on Feb. 15, 2010, which claims priority from Japanese Patent Application No. 2009-061526, filed on Mar. 13, 2009, the contents of all of which are incorporated herein by reference in their entirety.

TECHNICAL FIELD

The present invention relates to an optical modulator and a method for manufacturing the optical modulator which is required in the field of information processing and telecommunication and which converts a high-speed electric signal into an optical signal at high speed. More specifically, the present invention relates to an optical modulator and a method for manufacturing the optical modulator that uses a silicon-insulator-silicon capacitor structure and a PN (Positive-Negative) junction which are formed on an SOI (Silicon on Insulator) substrate.

BACKGROUND ART

The optical fiber communication, which was mainly used for business, has also been widely used for home use. As a result, an optical communication device of high performance has been required. As an optical communication device for use in various optical communication systems, such as an optical fiber communication system for home use and a local area network (LAN) system, there is a silicon-based optical communication device which functions at optical fiber communication wavelengths of 1330 nm and 1500 nm. The silicon-based optical communication device is a very promising device in which an optical functional element and an electronic circuit can be integrated on a silicon platform by using a CMOS (Complementary Metal Oxide Semiconductor) technique.

As silicon-based optical communication devices, passive devices, such as a waveguide, an optical coupler, and a wavelength filter, have been widely investigated. Further, active devices, such as a silicon-based optical modulator and a silicon-based optical switch, are listed as important elements of means for operating an optical signal in the above-described optical communication system, and have been attracting much attention. The optical modulator and the optical switch, in which the refractive index is changed by using the thermo-optic effect of silicon, have a low optical modulation speed, and hence can be used only for a device having an optical modulation frequency of 1 Mb/s or lower. An optical modulator using the electro-optic effect is required for a device having an optical modulation frequency higher than 1 Mb/s.

Pure silicon does not exhibit any change in its refractive index due to the Pockels effect and exhibits a very small change in its refractive index due to the Franz-Keldysh effect and the Kerr effect. For this reason, many of the optical modulators that is proposed at present and that use the electro-optic effect utilize the carrier plasma effect. That is, the phase and intensity of light are changed by changing the real part and imaginary part of the refractive index by changing the density of free carriers in a silicon layer.

The density of free carriers in the optical modulator can be changed by the injection, accumulation, depletion or inversion of the free carriers. Many of such optical modulators, which have been investigated to date, have a low optical modulation efficiency, and require, for optical phase modulation, a length of 1 mm or more and an injection current density of 1 kA/cm$^3$ or more. In order to realize miniaturization, high integration, and low power consumption in the optical modulator, a device structure having high optical modulation efficiency is required. When a device structure having high optical modulation efficiency is realized, the length required for the optical phase modulation can be reduced. Further, in the case where an optical communication device has a large size, it is also conceivable that the optical communication device is liable to be affected by the temperature on the silicon substrate, and thereby the electro-optic effect to be originally obtained is cancelled by a change in the refractive index of the silicon layer resulting from the thermo-optic effect.

FIG. 1 shows an example of a related art of a silicon-based electro-optical optical modulator using a rib waveguide formed on an SOI (Silicon on Insulator) substrate. Embedded oxide layer 32 and intrinsic semiconductor 31 including a rib-shaped portion are laminated in order on substrate 33. P$^+$-doped semiconductor 34 and n$^+$-doped semiconductor 35 are respectively formed on both sides of the rib-shaped portion of the intrinsic semiconductor 31 so as to be separated from each other by a distance. P$^+$-doped semiconductor 34 and n$^+$-doped semiconductor 35 are formed by performing a high concentration doping process to respective parts of intrinsic semiconductor 31. The optical modulator shown in FIG. 1 is configured as a PIN (P-intrinsic-N) diode. When a forward bias voltage or a reverse bias voltage is applied to the PIN diode, the density of free carriers in intrinsic semiconductor 31 is changed, so that the refractive index is changed by the carrier plasma effect. In this example, electrode contact layer 36 is arranged on one side of the rib-shaped portion of intrinsic semiconductor 31, and p$^+$-doped semiconductor 34 described above is formed at a position facing electrode contact layer 36. Similarly, electrode contact layer 36 is arranged also on the other side of the rib-shaped portion of intrinsic semiconductor 31, and n$^+$-doped semiconductor 35 is formed at a position facing electrode contact layer 36. Further, the waveguide including the rib-shaped portion is covered by oxide clad 37. In the above-described PIN diode structure, the doping process can be performed at a high concentration so that the density of carriers in semiconductors 34 and 35 becomes about 10$^{20}$/cm$^3$.

When an optical modulation operation is performed, forward bias voltage is applied to the PIN diode from a power source connected to electrode contact layers 36, so that free carriers are injected into the waveguide. At this time, free carriers are increased, and thereby the refractive index of intrinsic semiconductor 31 is changed, so that the light propagated through the waveguide is phase-modulated. However, the speed of the optical modulation operation is restricted by the lifetime of free carriers in the rib-shaped portion of intrinsic semiconductor 31, and by the carrier diffusion at the time when the application of the forward bias voltage is stopped. The electro-optical optical modulator having the related art PIN diode structure as described above usually has an operating speed in the range from 10 to 50 Mb/s at the time when the forward bias voltage is applied. On the other hand, by introducing impurities into intrinsic semiconductor 31 in order to reduce the lifetime of carriers, the switching speed of the electro-optical optical modulator can be increased. However, there is a problem that the introduced impurities lower the optical modulation efficiency. Further, the major factor that influences the operation speed is the RC time constant. The electrostatic capacitance at the time when the forward bias voltage is applied is significantly increased by the reduction in the carrier depletion layer of the PN (Positive-Negative) junction portion. Theoretically, the high-speed operation of the PN junction portion can be realized by applying a reverse bias voltage. However, a comparatively high drive voltage or a large element size is required in this case.

As another example of the related art, Patent literature 1 discloses a silicon-based electro-optical optical modulator having a capacitor structure in which embedded oxide layer 32 and a first conductivity type main body region are laminated in order on substrate 33, in which a second conductivity type gate region is further laminated so as to partially overlap the main body region, and in which thin dielectric layer 41 is then formed at the lamination interface between the main body region and the gate region. Note that hereinafter, "thin" is intended to mean a thickness of submicron order (less than 1 μm).

FIG. 2 shows a silicon-based electro-optical optical modulator having an SIS (silicon-insulator-silicon) structure according to the related art. The electro-optical optical modulator is formed on an SOI substrate configured by substrate 33, embedded oxide layer 32, and a main body region. The main body region is configured by p-doped semiconductor 38 formed by performing a doping process on the silicon layer of the SOI substrate, p$^+$-doped semiconductor 34 formed by performing a high concentration doping process on the silicon layer of the SOI substrate, and electrode contact layer 36. The gate region is configured by n-doped semiconductor 39 formed by performing a doping process on a thin silicon layer laminated on the SOI substrate, n$^+$-doped semiconductor 35 formed by performing a high concentration doping process on the thin silicon layer, and electrode contact layer 36. Oxide clad 37 is provided in the gap formed by embedded oxide layer 32, the main body region and the gate region, and is also provided on the main body region and the gate region.

The region subjected to the doping process is configured such that the change in carrier density is controlled by an external signal voltage. Further, when a voltage is applied between electrode contact layers 36, free carriers are accumulated, depleted or inverted on both sides of dielectric layer 41. Thereby, the optical phase modulation is performed. For this reason, it is preferred that the region of optical signal electric field be made to coincide with the region in which the carrier density is dynamically controlled from the outside.

CITATION LIST

Patent Literature

Patent Literature 1: JP 2006-515082 A

SUMMARY OF INVENTION

Technical Problem

In the method of Patent Literature 1, optical phase modulation can be performed, but the thickness of the region where the carrier density is dynamically changed is actually reduced to be as thin as about several tens nm. For this reason, an optical modulation length having a millimeter order of magnitude (1 mm or more) is required, so that the size of the optical modulator is also increased and high-speed operation is made difficult. Therefore, in a silicon-based optical modulator which can be integrated on a silicon substrate, it is difficult to realize an optical modulator in which low cost, low current density, low power consumption, high modulation degree, low voltage drive, and high speed modulation can be realized on the basis of the carrier plasma effect in a region having a thickness in which order of magnitude is a submicron order (less than 1 μm).

An object of the present invention is to provide an optical modulator and a method for manufacturing the optical modulator that can solve the problem in which it is difficult to provide an optical modulator having a small size and having high phase and high frequency modulation degrees.

The optical modulator according to the present invention includes at least a semiconductor layer subjected to a doping process so as to exhibit a first conductivity type, and a semiconductor layer subjected to a doping process so as to exhibit a second conductivity type. Further, in the optical modulator according to the present invention, at least, the first conductivity type semiconductor layer, a dielectric layer, the second conductivity type semiconductor layer, and a transparent electrode layer optically transparent at least in a near-infrared wavelength region are laminated in order.

Advantageous Effects of Invention

According to the present invention, the optical field is confined in the rib waveguide, and hence overlapping between the optical field and the region of carrier density modulation is increased. Thereby, even when the length of optical modulation is short, light can be sufficiently modulated, so that it is possible to realize an optical modulator having a small size and having high phase and high frequency modulation degrees.

DESCRIPTION OF EMBODIMENTS

Figure 1:
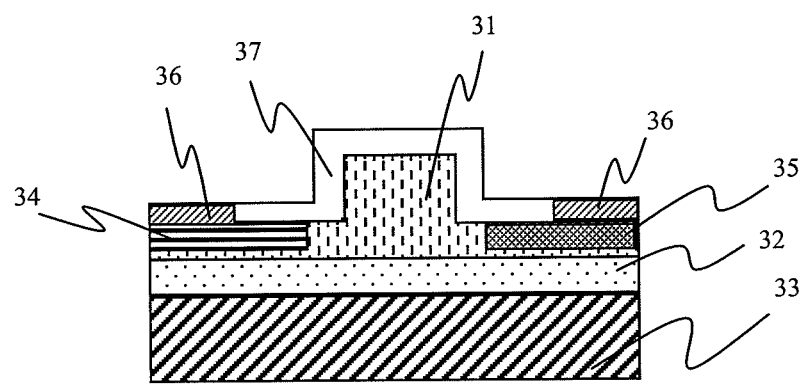
FIG. 1 is a schematic view showing a configuration of an example of an optical modulator of the related art.
Figure 2:
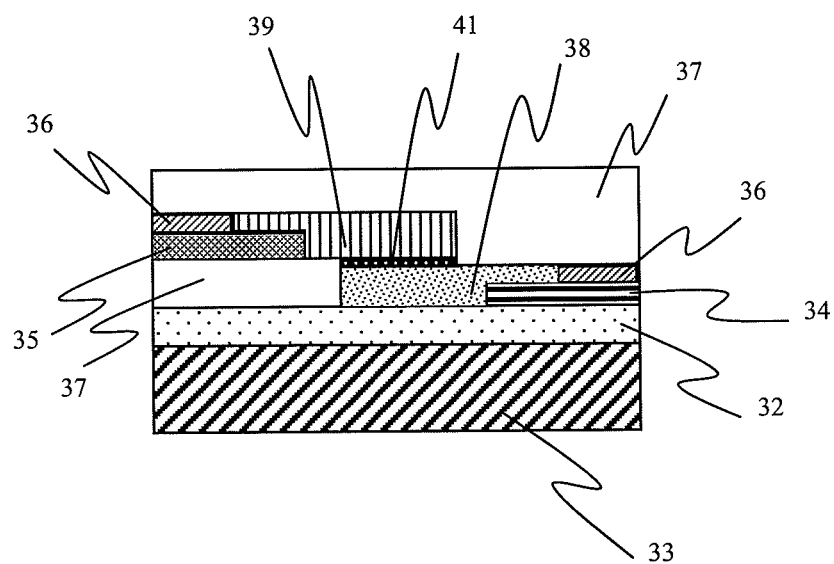
FIG. 2 is a schematic view showing a configuration of another example of the optical modulator of the related art.

In the following, exemplary embodiments according to the present invention will be described with reference to the accompanying drawings. Note that the same reference numeral is given to the configurations having the same function in the accompanying drawings, and the description thereof may be omitted.

Before an exemplary structure of an optical modulator according to the present invention is described, a modulation mechanism of carrier density in a silicon layer, which mechanism is used as the basis of the operation according to the present invention, will be described. The silicon-based optical modulator according to the present invention utilizes the carrier plasma effect as described below.

As described above, pure silicon does not exhibit any change in its refractive index due to the Pockels effect, and exhibits a very small change in its refractive index due to the Franz-Keldysh effect and the Kerr effect. Therefore, only the carrier plasma effect and the thermo-optic effect can be used for the optical modulation operation. However, the modulation speed of the optical modulator which modulates the refractive index by using the thermo-optic effect is low. Therefore, only carrier diffusion based on the carrier plasma effect is effective for realizing high-speed operation (1 Gb/s or more) to which the present invention is directed. The change in refractive index due to the carrier plasma effect is explained by using a first-order approximation value obtained from the following formulas derived from the Kramers-Kronig relational formula and the Drude formula.

$$\Delta n = -\frac{e^2 \lambda^2}{8\pi^2 c^2 \varepsilon_0 n} \left( \frac{\Delta N_e}{m_e} + \frac{\Delta N_k}{m_k} \right) \quad \text{[formula 1]}$$

$$\Delta k = -\frac{e^3 \lambda^2}{8\pi^2 c^3 \varepsilon_0 n} \left( \frac{\Delta N_e}{m_e^2 \mu_e} + \frac{\Delta N_k}{m_k^2 \mu_k} \right) \quad \text{[formula 2]}$$

In the formulas, $\Delta n$ and $\Delta k$ respectively represent the real part and the imaginary part of a change in the refractive index of a silicon layer, e represents the amount of electric charge, $\lambda$ represents the wavelength of light, $\varepsilon_0$ represents the dielectric constant in vacuum, n represents the refractive index of intrinsic silicon, $m_e$ represents the effective mass of an electron carrier, $m_k$ represents the effective mass of a hole carrier, $\mu_e$ is the mobility of the electron carrier, $\mu_k$ represents the mobility of the hole carrier, $\Delta N_e$ represents a change in the density of the electron carrier, and $\Delta N_k$ represents a change in the density of the hole carrier. Experimental evaluation of the carrier plasma effect in silicon was previously performed. From the evaluation result, it was found that changes in refractive index due to changes in carrier density at each of optical communication wavelengths of 1330 nm and 1500 nm used in the optical communication system match well with the results obtained by the above-described formulas. Further, in the electro-optical optical modulator using the carrier plasma effect, the phase change amount is defined by the following formula.

$$\Delta \theta = \frac{2\pi}{\lambda} \Delta n_{\mathit{eff}} L \quad \text{[formula 3]}$$

In the formula, L represents the length of the active layer along the propagation direction of light in the electro-optical optical modulator.

In the present invention, the phase change amount is based on an effect larger than the optical absorption effect, and hence the electro-optical optical modulator described below can basically exhibit the features as a phase modulator.

An optical modulator according to the present invention, which has a silicon-dielectric layer-silicon capacitor structure formed on an SOI (Silicon on Insulator) substrate and which uses the free carrier plasma effect, will be described as follows.

Figure 3:
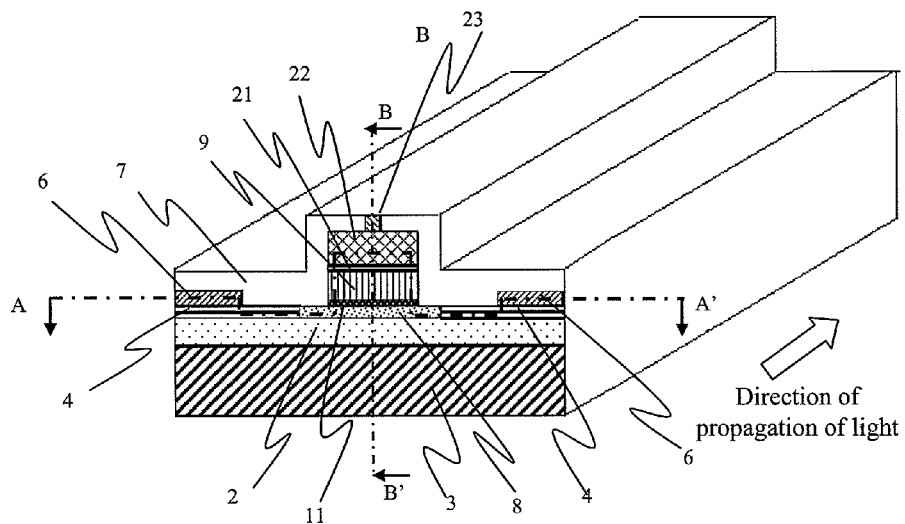
FIG. 3 is a schematic view showing a configuration of an exemplary embodiment of an optical modulator according to the present invention.
Figure 4:
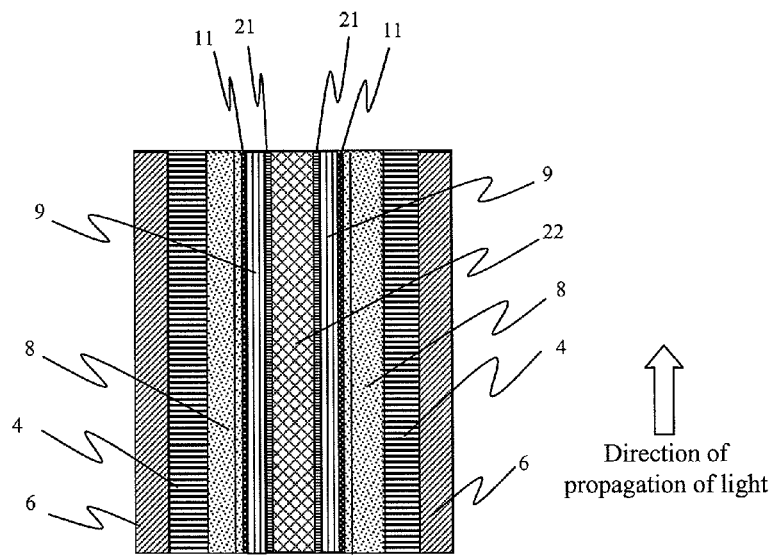
FIG. 4 is a schematic sectional view along line AA' of the optical modulator in FIG. 3.
Figure 5:
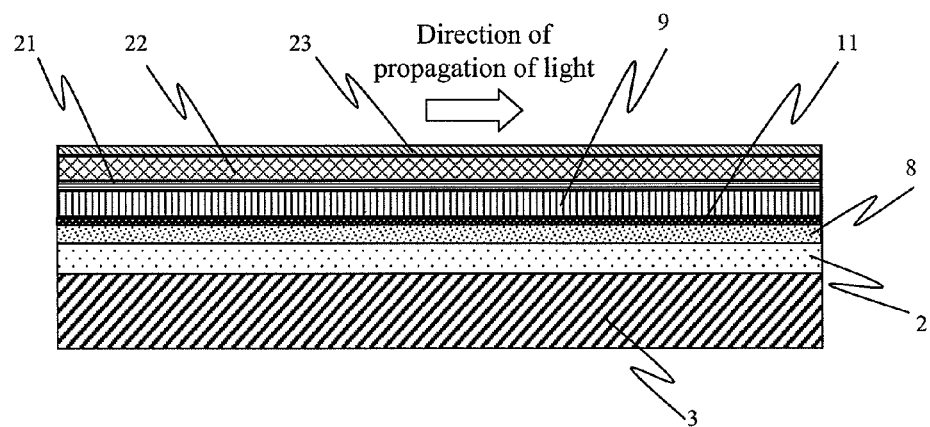
FIG. 5 is a schematic sectional view along line BB' of the optical modulator in FIG. 3.

FIG. 3 is a schematic sectional view showing an example of an exemplary embodiment of the optical modulator according to the present invention. FIG. 4 is a schematic sectional view along line AA' of the optical modulator in FIG. 3, and FIG. 5 is a schematic sectional view along line BB' of the optical modulator in FIG. 3. Note that in the figures, the arrow represents the propagation direction of light.

The basic structure of the optical modulator will be described as follows. An SOI substrate is configured in such a manner that embedded oxide layer 2 is formed on substrate 3, and further first conductivity type semiconductor (hereinafter all referred to as "p-doped semiconductor") 8 is laminated on embedded oxide layer 2. Thin (hereinafter "thin" means a thickness having submicron order of magnitude (less than 1 μm)) dielectric layer 11, second conductivity type semiconductor (hereinafter all referred to as "n-doped semiconductor") 9, silicide 21, and transparent conductive layer 22 are laminated in order on p-doped semiconductor 8 so as to be formed in a rib shape.

Doped region (hereinafter all referred to as "p$^+$-doped semiconductor") 4 subjected to a high-concentration doping process is formed in the slab region on each of both sides of the rib shape. Further, electrode contact layer 6 is formed on p$^+$-doped semiconductor 4, and metal electrode 23 is formed on transparent conductive layer 22. Further, the whole waveguide is covered by oxide clad 7.

Figure 15A:
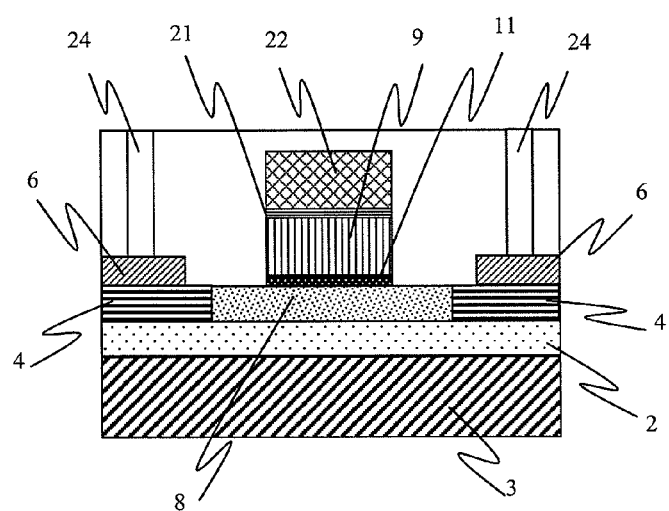
FIG. 15A is a view showing a manufacturing process subsequent to the manufacturing process in FIG. 14C.
Figure 15B:
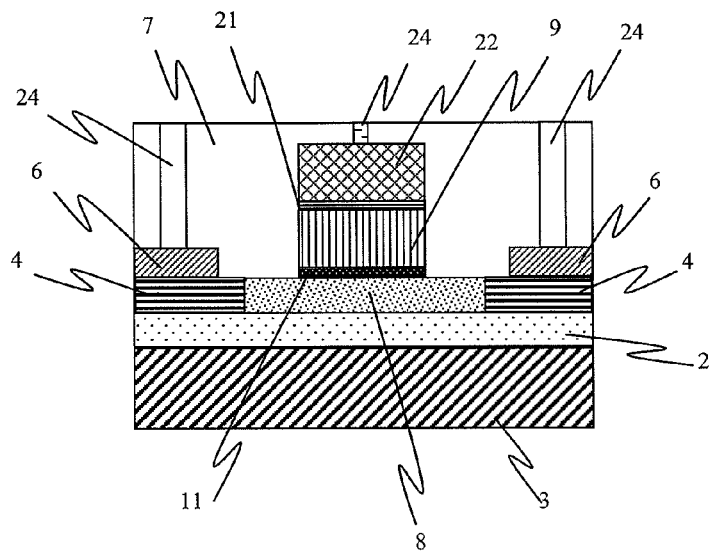
FIG. 15B is a view showing a manufacturing process subsequent to the manufacturing process in FIG. 15A.
Figure 15C:
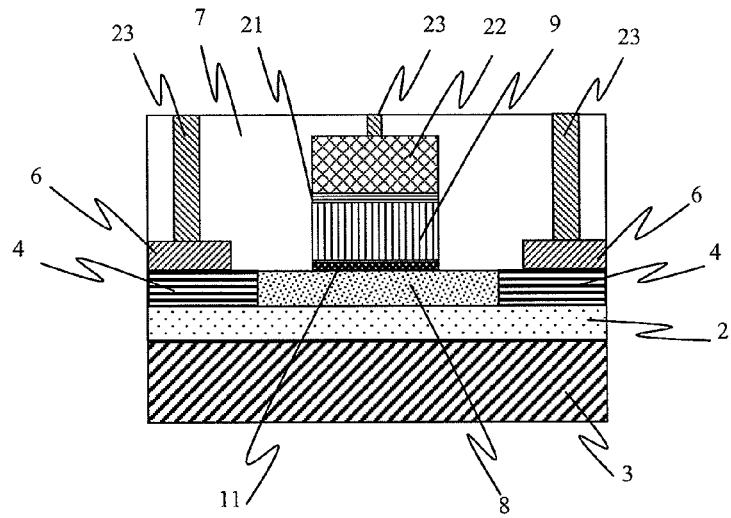
FIG. 15C is a view showing a manufacturing process subsequent to the manufacturing process in FIG. 15B.

Note that, in practice, as shown in FIG. 15C, actually, electrode contact layer 6 is also connected to metal electrode 23 so as to be connected to the outside via metallic electrode 23.

In the present exemplary embodiment, which has a silicon semiconductor-dielectric layer-silicon semiconductor capacitor structure, conductive layer (hereinafter all referred to as "transparent electrode") 22, which has a refractive index smaller than that of the silicon semiconductor layer and which is optically transparent in a near-infrared wavelength region, is further laminated as an electrode material connected to n-doped semiconductor 9. Thereby, the overlapping between the optical field and the region of carrier density modulation is increased, so that the size of the optical modulator can be reduced. Further, as compared with the conventional structure, the optical loss due to the overlapping between the optical field and the transparent electrode 22 is reduced, so that the electric power of the light source can be reduced. Further, by further increasing the doping concentration of the region of p-doped semiconductor 8 and n-doped semiconductor 9, which are adjacent to the joining interface of the above-described capacitor structure, is further increased, the series resistance component can be reduced, so that the RC time constant can be reduced.

In the present invention, n-doped semiconductor 9 and transparent electrode 22 are not directly connected to each other, but a layer of silicide 21 is formed at the boundary surface between n-doped semiconductor 9 and transparent electrode 22. Thereby, the contact resistance between n-doped semiconductor 9 and transparent electrode 22 can be reduced, so that extra additional resistance can be reduced.

Further, in the present invention, the waveguide shape is formed in the rib shape as shown in FIG. 3 in order to reduce optical absorption loss due to overlapping of the optical field with the regions of p-doped semiconductor 8 and n-doped semiconductor 9 in which regions the doping concentration is increased. Further, with the structure in which the doping concentration of the slab region is increased, it is also possible to obtain an optical modulator which has low optical loss and a small RC time constant and which operates at high speed.

Here, the thickness of the region, which is adjacent to the joining interface of the capacitor structure and in which carrier modulation is performed, is referred to as "maximum depletion layer thickness W", and the thickness W in the thermal equilibrium state is expressed by the following formula.

$$W = 2\sqrt{\frac{\varepsilon_s kT \ln\left(\frac{N_c}{n_i}\right)}{e^2 N_c}} \qquad \text{[formula 4]}$$

In the formula, $\varepsilon_s$ represents the dielectric constant of the semiconductor layer, k represents the Boltzmann's constant, $N_c$ represents the carrier concentration, $n_i$ represents the intrinsic carrier concentration, and e represents the charge amount. For example, when $N_c$ is $10^{17}/cm^3$, the maximum depletion layer thickness W is about 0.1 µm. The thickness of maximum depletion layer thickness W, that is, the thickness of the region in which the carrier concentration is modulated is reduced as the carrier concentration is increased.

The rib waveguide structure according to the present exemplary embodiment is designed so that, when the conductive layer (transparent electrode 22) which is optically transparent in the near-infrared wavelength range is laminated on the above-described capacitor structure, the overlapping of the optical field with the region where the carrier concentration is modulated is maximized.

When the effective refractive index, which can be sensed by the optical signal electric field, is represented as $n_{eff}$, and when the optical signal wavelength is represented as λ, the size of the optical field is represented by $λ/n_{eff}$. Therefore, when the height of the region, where the carrier concentration, is modulated is set to about $λ/n_{eff}$, the overlapping of the optical field with the region, where the carrier concentration is modulated, is maximized, so that an effective optical phase modulation is realized.

Therefore, highest optical modulation efficiency is obtained when the region, in which the optical signal electric field has peak intensity, is arranged in the region which is located on both sides of dielectric layer 11 and in which free carriers are accumulated, depleted, or inverted.

In the optical modulator configured by the SIS capacitor structure according to the present invention, when an electric signal is applied as a drive voltage, accumulation, depletion or inversion of carriers is caused on both sides of dielectric layer 11. However, it is estimated that the thickness (maximum depletion layer) W of the region where the carrier concentration is modulated is about 100 nm. Therefore, there is a problem that the region where the carrier concentration is modulated is very small as compared with the spread of the optical signal electric field, and hence the optical modulation efficiency is low. In the present exemplary embodiment, the layer of transparent electrode 22 connected to the upper portion of the rib waveguide structure is formed as a conductive layer which has a refractive index smaller than that of the silicon semiconductor layer and which is transparent in the near-infrared wavelength region. Thereby, the optical field is confined in the rib waveguide, so that the optical modulation can be more efficiently performed. At this time, the shape of the rib waveguide is preferably designed such that, when the effective refractive index which can be sensed by the signal electric field is represented as $n_{eff}$, when the optical signal wavelength is represented as λ, and when the thickness of the region where the carrier concentration is modulated is represented as W, the value of 2W is close to the value of $λ/n_{eff}$.

Further, it is preferable to use, as transparent electrode 22, an oxide conductor made of indium tin oxide, cadmium tin oxide, tin oxide, zinc oxide, or the like. However, when such an oxide conductor film is formed on the silicon semiconductor layer, there arises a problem that the contact resistance is increased. In order to solve this problem, it is preferable to form silicide layer 21 at the lamination interface between the silicon semiconductor layer and the layer of transparent electrode 22.

Figure 6:
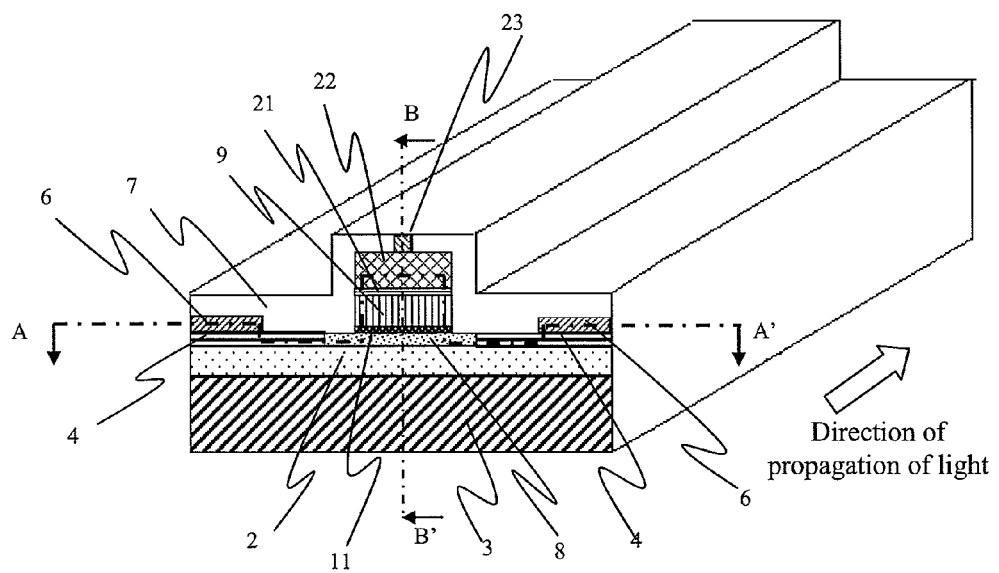
FIG. 6 is a schematic view showing a configuration of another exemplary embodiment of the optical modulator according to the present invention.
Figure 7:
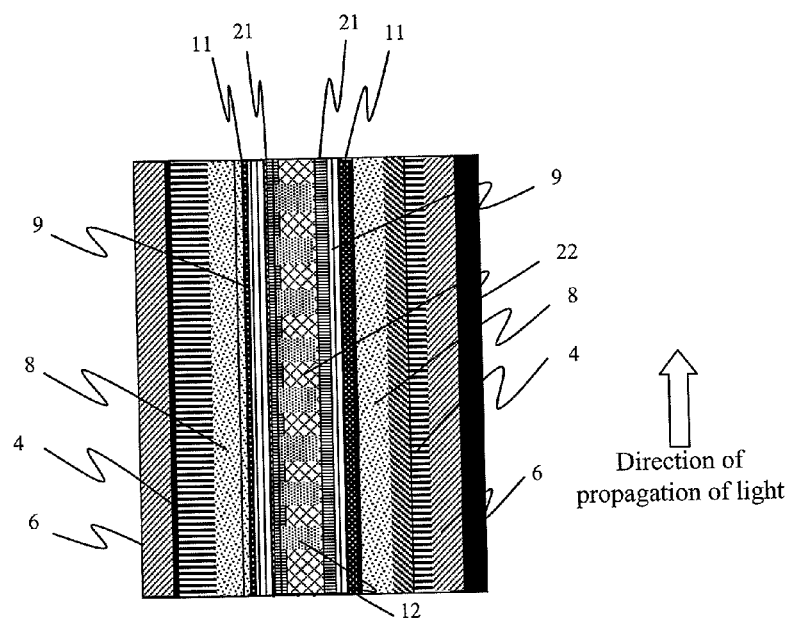
FIG. 7 is a schematic sectional view along line AA' of the optical modulator in FIG. 4.
Figure 8:
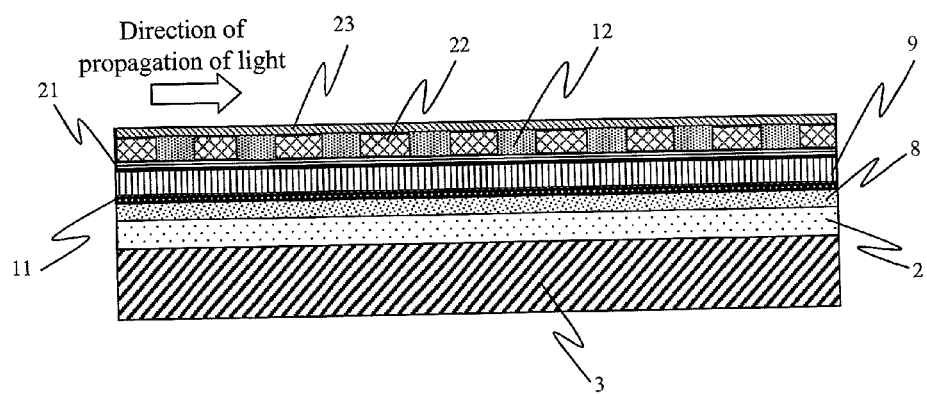
FIG. 8 is a schematic sectional view along line BB' of the optical modulator in FIG. 4.

FIG. 6 is a schematic sectional view showing an example of another exemplary embodiment of the optical modulator according to the present invention. FIG. 7 is a schematic sectional view along line AA' of the optical modulator in FIG. 6, and FIG. 8 is a schematic sectional view along line BB' of the optical modulator in FIG. 6. Note that, in the figures, the arrow represents the propagation direction of light. The description of the same configuration as that of the above-described exemplary embodiment is omitted.

The optical modulator according to the present exemplary embodiment is featured in that conductive layer (transparent electrode) 22 which has a refractive index smaller than that of the silicon semiconductor layer and is optically transparent in the near-infrared wavelength region, and silicon oxide layer 12 which is a layer of insulator are laminated on silicide 21 as the electrode material connected to second conductivity type semiconductor 9 so as to be periodically alternately located along the propagation direction of light. Thereby, the propagation of the optical signal is delayed by silicon oxide layer 12, so that the optical modulation efficiency can be improved. The layer of transparent electrode 22 may be periodically formed so as to delay the group velocity of the optical signal.

Alternatively, in order to suppress the reflection of the optical signal, the layer of transparent electrode 22 may be arranged at an interval of $\lambda/n_{\it eff}$ or less when the effective refractive index which can be non-periodically sensed by the optical signal electric field is represented as $n_{\it eff}$, and when the optical signal wavelength is represented as $\lambda$.

Figure 9:
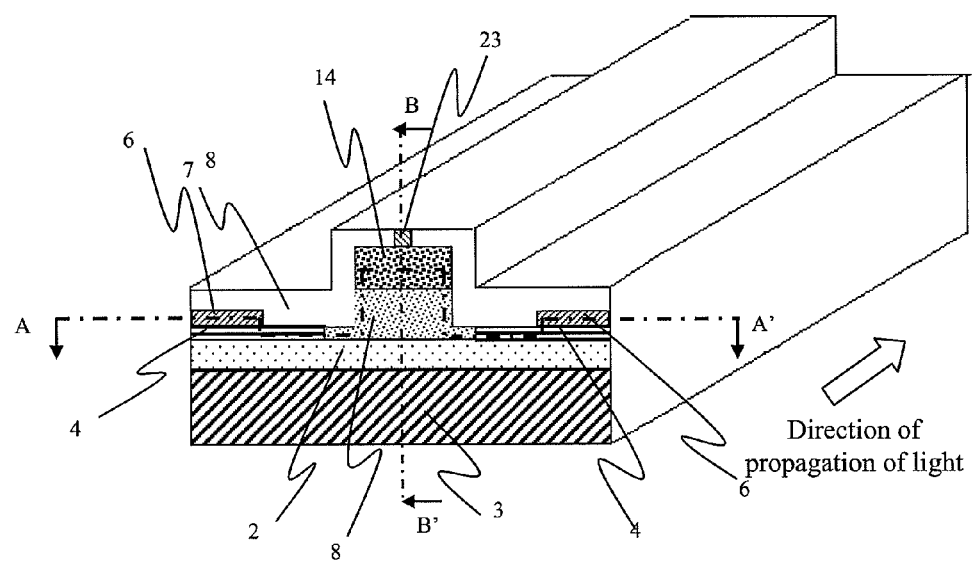
FIG. 9 is a schematic view showing a configuration of another exemplary embodiment of the optical modulator according to the present invention.
Figure 10:
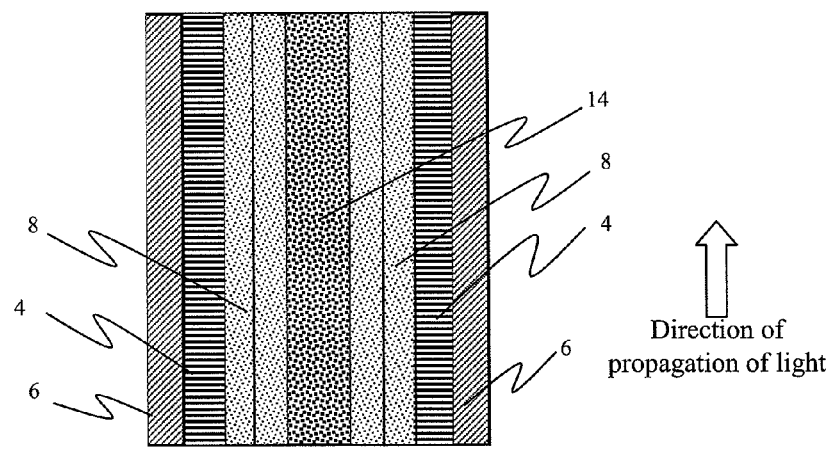
FIG. 10 is a schematic sectional view along line AA' of the optical modulator in FIG. 9.
Figure 11:
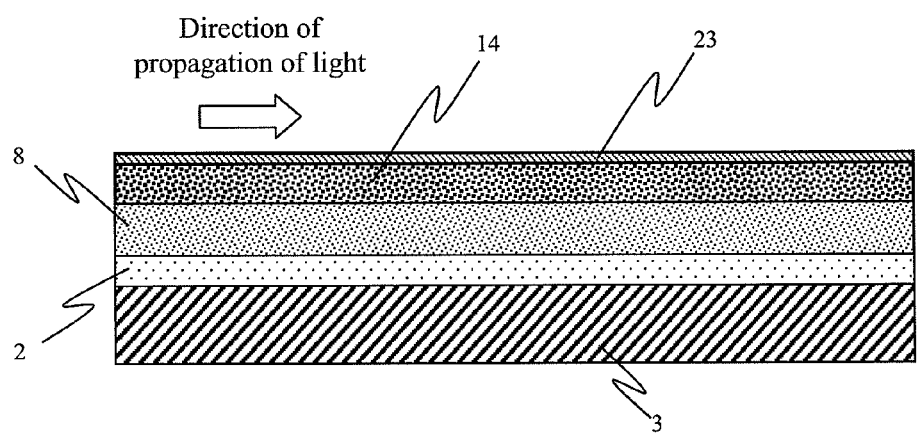
FIG. 11 is a schematic sectional view along line BB' of the optical modulator in FIG. 9.

FIG. 9 is a schematic sectional view showing an example of another exemplary embodiment of the optical modulator according to the present invention. FIG. 10 is a schematic sectional view along line AA' of the optical modulator in FIG. 9, and FIG. 11 is a schematic sectional view along line BB' of the optical modulator in FIG. 9. Note that, in the figures, the arrow represents the propagation direction of light. The description of the same configuration as that of the above-described exemplary embodiment is omitted.

In the optical modulator according to the present exemplary embodiment, a semiconductor, which has a refractive index smaller than that of the silicon semiconductor and which is optically transparent in the near-infrared wavelength region, is used as the second conductivity type semiconductor. A layer made of zinc oxide is listed as the semiconductor layer which is optically transparent in the near infrared region. In the present exemplary embodiment, a PN junction is formed by forming n-doped zinc oxide semiconductor (hereinafter all referred to as "n-doped wide gap semiconductor") 14 on the p-type doped layer of p-doped semiconductor 8. At this time, the optical refractive index of n-doped wide gap semiconductor 14 is sufficiently smaller than the optical refractive index of p-doped semiconductor 8. When n-doped wide gap semiconductor 14 is made of the zinc oxide semiconductor, the optical refractive index is about 1.9 to about 2.0. Therefore, when p-doped semiconductor 8 is processed into a rib waveguide shape, and when n-doped wide gap semiconductor 14 is laminated on p-doped semiconductor 8 which is processed, the optical field is confined in p-doped semiconductor 9. Therefore, the optical modulation can be more efficiently performed.

An example of a method for forming the optical modulator using the transparent conductor electrode according to the present invention is shown in FIG. 12 to FIG. 14.

Figure 12A:
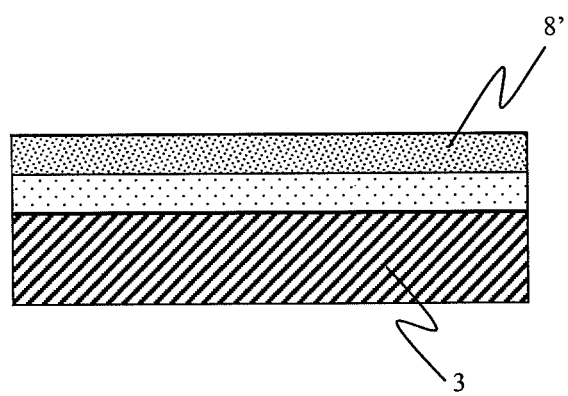
FIG. 12A is a view showing a manufacturing process of the optical modulator in FIG. 3.

FIG. 12A is a sectional view of an SOI substrate used to form the optical modulator according to the present invention. The SOI substrate is configured such that embedded oxide layer 2 is laminated on substrate 3, and such that silicon layer 8' having a thickness of about 100 to about 1000 nm (1 μm) is laminated on embedded oxide layer 2. The thickness of embedded oxide layer 2 is set to 1000 nm (1 μm) or more to reduce the optical loss. A substrate which is subjected to a doping process beforehand so as to exhibit the first conductivity type, or a silicon surface layer in which phosphorus or boron is doped by ion implantation, or the like, and which is then subjected to heat treatment may also be used as silicon layer 8' laminated on the embedded oxide layer 2. FIG. 12A shows a state of p-doped semiconductor 8 formed by doping boron into silicon layer 8'.

Figure 12B:
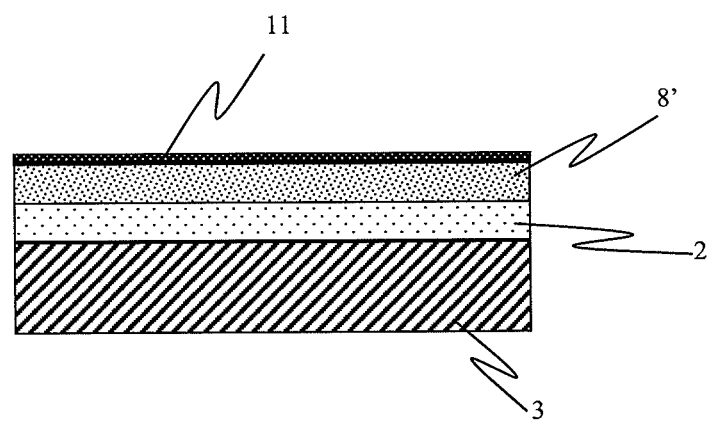
FIG. 12B is a view showing a manufacturing process subsequent to the manufacturing process in FIG. 12A.

Next, as shown in FIG. 12B, dielectric layer 11 having a thickness of about 5 to about 10 nm is formed on p-doped semiconductor 8 by heat treatment. Dielectric layer 11 may be a $SiN_x$ layer, and the like, which is formed by a film forming method, such as a low-pressure CVD (Chemical Vapor Deposition) method.

Figure 13A:
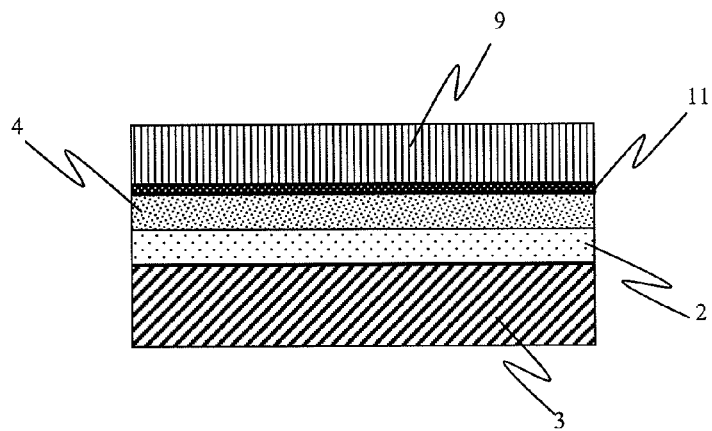
FIG. 13A is a view showing a manufacturing process subsequent to the manufacturing process in FIG. 12B.

Next, as shown in FIG. 13A, a layer of polycrystalline silicon 9 is formed on dielectric layer 11 by a CVD method or a sputtering method. Further, in order to make polycrystalline silicon 9 exhibit the second conductivity type, the layer of polycrystalline silicon 9 is subjected to a doping process while being formed, or is, after being formed, subjected to doping of boron or phosphorus (subjected to doping of an element different from the element doped into first conductivity type semiconductor 8) by ion implantation, or the like. In FIG. 13A, it is assumed that doping of phosphorus is performed, and that polycrystalline silicon 9 is an n-doped semiconductor.

Figure 13B:
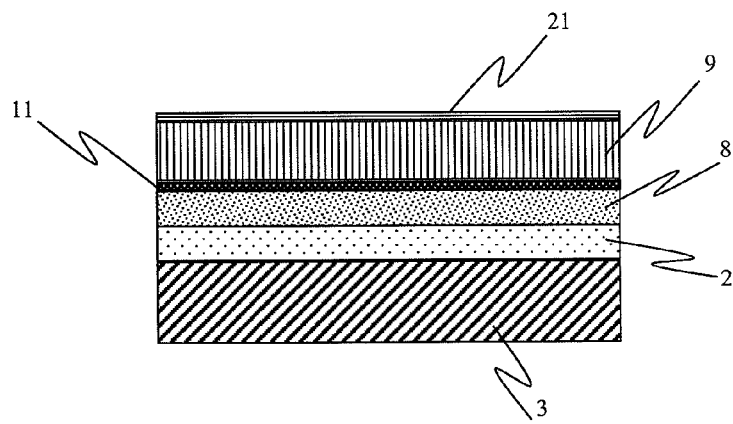
FIG. 13B is a view showing a manufacturing process subsequent to the manufacturing process in FIG. 13A.

Next, as shown in FIG. 13B, the layer of n-doped semiconductor 9, on which a nickel layer, and the like, is laminated, is then subjected to an annealing process at 400 to 600 degrees to form a layer of silicide ($NiSi_2$) 21, and the unreacted nickel layer is removed by a sulfuric acid-containing aqueous solution.

Figure 13C:
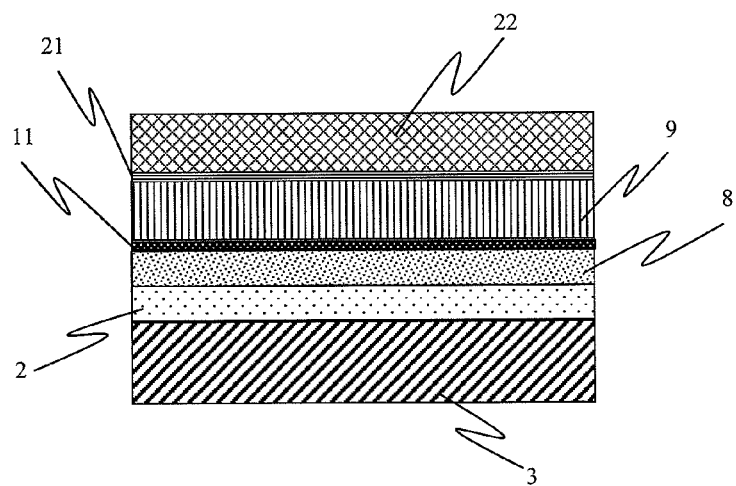
FIG. 13C is a view showing a manufacturing process subsequent to the manufacturing process in FIG. 13B.

Next, as shown in FIG. 13C, an oxide dielectric film, such as an indium tin oxide film and a zinc oxide film, which oxide dielectric film has a refractive index smaller than that of the layers of silicon semiconductors 8 and 9, and which oxide dielectric film is a conductive body optically transparent in the near-infrared wavelength region, is formed as transparent electrode 22 on the layer of silicide 21 by a CVD method, a sputtering method, or the like.

Figure 14A:
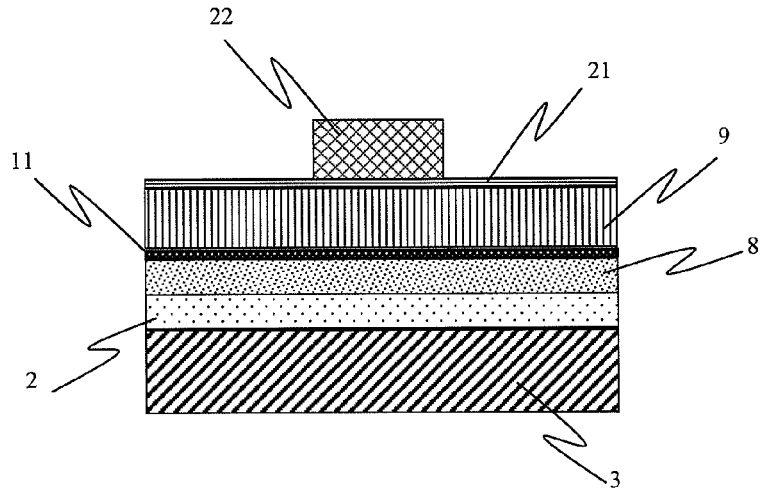
FIG. 14A is a view showing a manufacturing process subsequent to the manufacturing process in FIG. 13C.

Next, as shown in FIG. 14A, transparent electrode 22 is processed by a reactive plasma etching method, or the like, so that the width (the width of optical waveguide structure, that is, the rib width) of transparent electrode 22 is set to 0.3 μm to 2 μm or less.

Figure 14B:
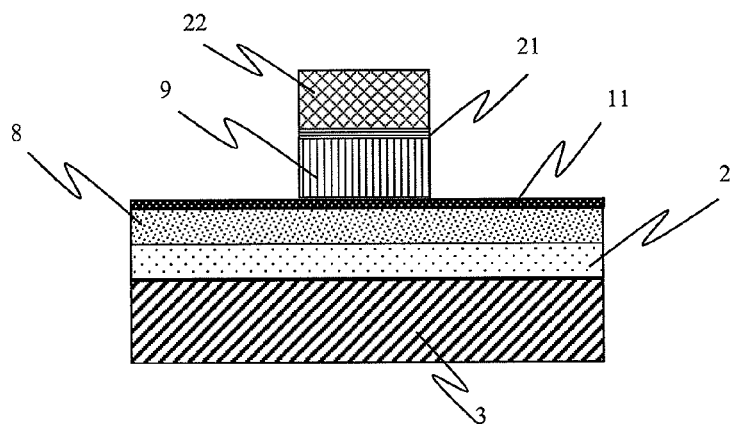
FIG. 14B is a view showing a manufacturing process subsequent to the manufacturing process in FIG. 14A.

Further, as shown in FIG. 14B, n-doped semiconductor 9 is subjected to etching by a reactive etching method, or the like, using patterned transparent electrode 22 as a mask. At this time, dielectric layer 11 is used as an etching stop film.

Figure 14C:
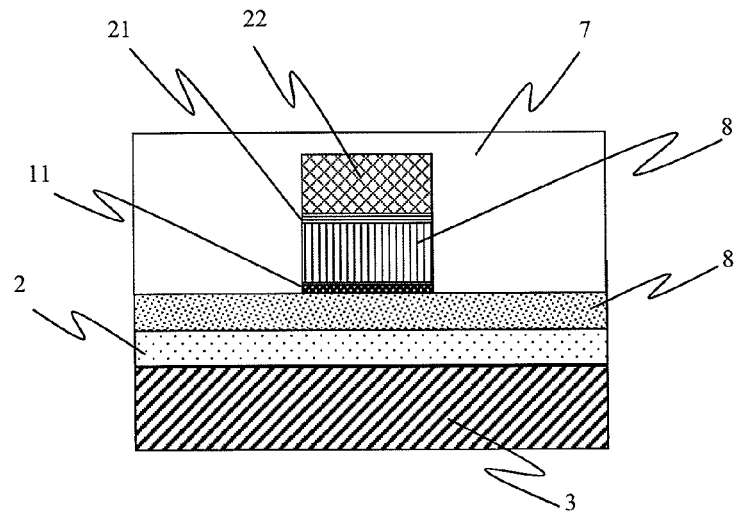
FIG. 14C is a view showing a manufacturing process subsequent to the manufacturing process in FIG. 14B.

Next, as shown in FIG. 14C, oxide clad 7 is laminated. At this time, it is preferable to smooth the surface of oxide clad 7 by a CMP (Chemical-Mechanical Polishing) method.

Next, as shown in FIG. 15A, contact holes 24 are formed in oxide clad 7 by reactive etching, and $p^+$-doped semiconductors 4 are formed by an ion implantation method. Further, $NiSi_2$ layer, or the like, is formed as electrode contact layers 6.

Further, as shown in FIG. 15B, contact hole 24 is also formed on transparent electrode 22.

Finally, as shown in FIG. 15C, metal electrode layers 23 made of TaN/Al (Cu), or the like, are formed so as to fill contact holes 24, and are then connected to a drive circuit.

Note that, in the present invention, each of silicon semiconductors 8 and 9, which are respectively subjected to the doping processes so as to respectively exhibit the first and second conductivity types, is configured by at least one layer selected from a group of layers respectively made of polycrystalline silicon, amorphous silicon, strained silicon, single crystal Si, and $Si_xGe_{(1-x)}$.

Figure 16A:
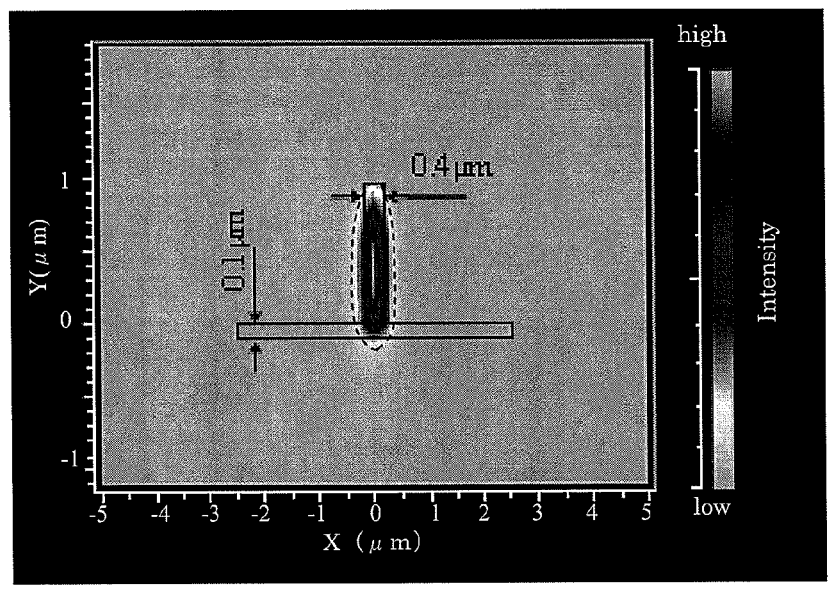
FIG. 16A is a view showing distribution of an optical field in the optical modulator of the related art.
Figure 16B:
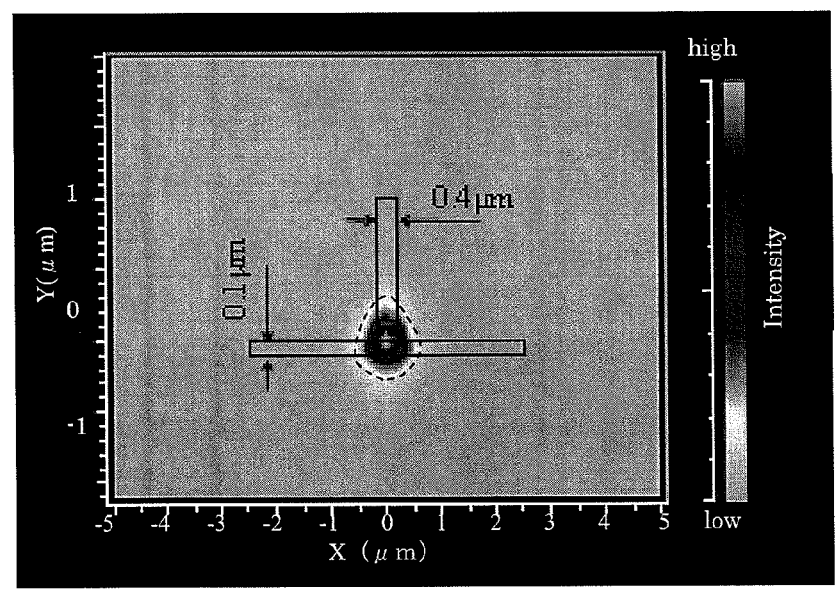
FIG. 16B is a view showing distribution of an optical field in the optical modulator according to the present invention.

The distribution of optical field in the related art optical modulator not using transparent electrode 22, and the distribution of optical field in the optical modulator using transparent electrode 22 according to the present invention were investigated. FIG. 16 shows the distribution diagram of the optical field. FIG. 16A shows the distribution of optical field in the optical modulator in which the related art rib waveguide was formed only by n-doped semiconductor 9, and FIG. 16B shows the distribution of optical field in the optical modulator in which transparent electrode 22 was used for the rib waveguide according to the present invention. Each of the figures shows a propagation state of light in the perpendicular cross section of the optical modulator, and the intensity of light passing through each portion of the optical waveguide is represented by the shade of color. Note that the traveling direction of light is the direction from the front side to the depth side. The rectangle surrounded by the white line and extended in the X direction represents the slab region including p-doped semiconductor 8, and the rectangle surrounded by the white line and extended in the Y direction represents the rib-shaped waveguide.

Further, although it is difficult to see in FIG. 16, the region surrounded by the broken line is the light passing region, and the light intensity is increased toward the center of the region surrounded by the broken line.

As shown in FIG. 16A, when the rib waveguide is framed only by n-doped semiconductor 9, the optical field spreads to the electrode layer in the upper portion of the rib waveguide, so that the optical propagation loss is increased. On the other hand, as shown in FIG. 16B, when transparent electrode 22 according to the present invention is used in the rib waveguide, the optical field is confined in the SIS junction region. Thereby, optical propagation loss can be reduced, so that the optical modulation efficiency can be improved.

Figure 17:
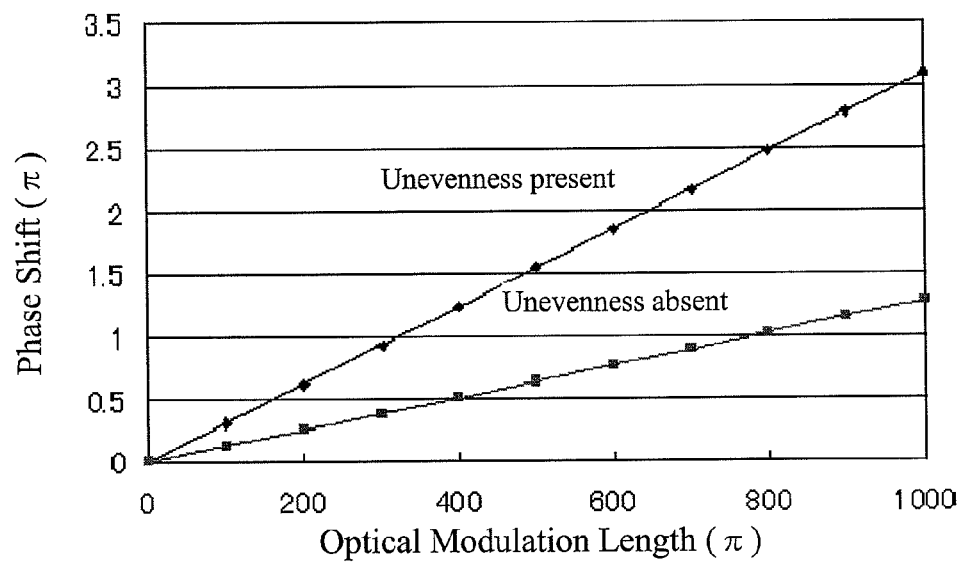
FIG. 17 is a graph showing a relationship between the optical modulation length and the amount of optical phase shift in the optical modulator according to the present invention and in the optical modulator of the related art.

Similarly to the above, the dependency of the amount of phase shift on the length in the optical signal propagation direction was investigated in the optical modulator, according to the present invention, in which transparent electrode 22 was used in the rib waveguide, and was also investigated in the related-art optical modulator in which the rib waveguide was formed only by n-doped semiconductor 9. An example of the test results is shown in FIG. 17.

In the optical modulator according to the present invention, the amount of phase shift is 2.5 times as large as the amount of phase shift in the related-art optical modulator. From this result, it can be seen that, when the rib waveguide is formed by using transparent electrode 22, the overlapping between the optical field and the carrier modulation region is greatly improved and hence the optical modulation efficiency is significantly improved.

Figure 18:
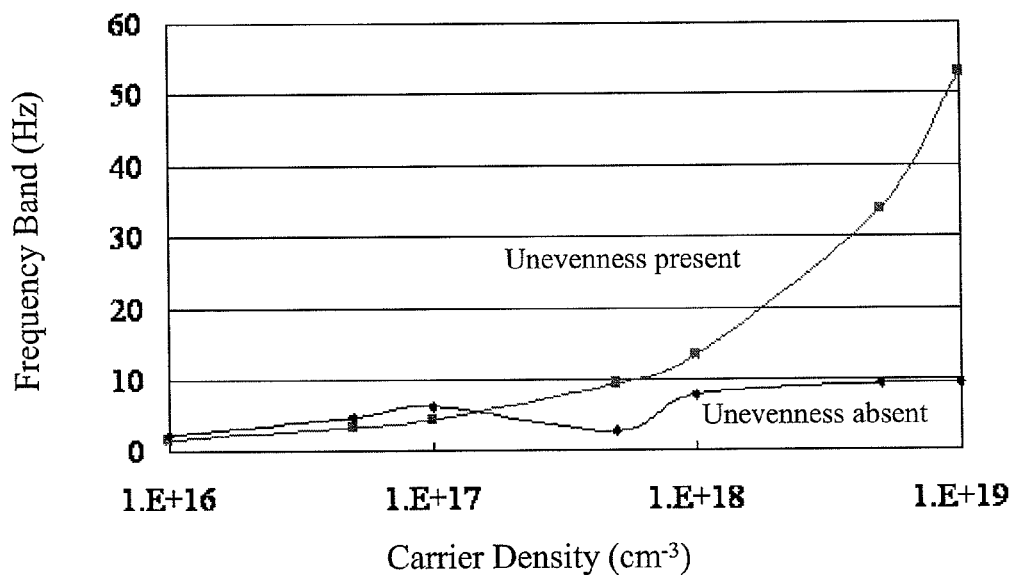
FIG. 18 is a graph showing a relationship between the carrier density and the frequency band in the optical modulator according to the present invention and in the optical modulator of the related art.

Further, similarly to the above, a relationship between the carrier concentration and the operation frequency band of optical modulation was investigated in the optical modulator, according to the present invention, in which transparent electrode 22 was used in the rib waveguide, and was also investigated in the related-art optical modulator in which the rib waveguide was formed only by n-doped semiconductor. An example of the test results is shown in FIG. 18.

Since the electric capacitance was reduced by reducing the length of optical phase modulation by using transparent electrode 22, and further since the modulation efficiency was improved by setting the carrier concentration to about $10^{18}/cm^3$, the modulation operation could be performed at a high speed of 10 GHz or more.

In addition to the above, the mobility and lifetime of carriers are also very important in order to improve the frequency band. In particular, the mobility of carriers in the polycrystalline silicon layer is a problem to be solved in order to achieve the high-speed operation. Therefore, the polycrystalline silicon is recrystallized by being subjected to an annealing process, so that the particle diameter of polycrystalline silicon is increased. Thereby, the mobility of the carriers is improved. Alternatively, as for the second conductivity type semiconductor layer, the crystal quality of polycrystalline silicon is improved by using an epitaxial lateral overgrowth (ELO) method, or the like.

Further, an example to which the optical modulator according to the present invention is applied will be described.

Figure 19:
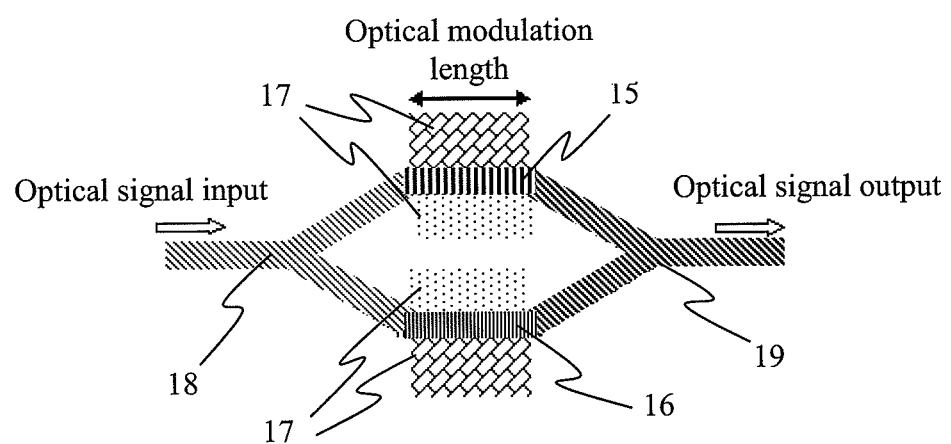
FIG. 19 is a schematic view showing a Mach-Zehnder-interferometer type optical intensity modulator using the optical modulator according to the present invention.

FIG. 19 shows a structure of a Mach-Zehnder interferometer type optical intensity modulator using the optical modulator according to the present invention. An optical intensity modulation signal can be obtained in such a manner that a Mach-Zehnder interferometer is used, and such that the optical signals having a phase difference therebetween caused in the two arms of the Mach-Zehnder interferometer are made to interfere with each other.

The optical intensity modulator has first arm 15 and second arm 16 which are the optical modulators arranged in parallel to each other, and which are connected to optical branching structure 18 so as to be branched off from each other at the input side, and which are also connected to optical coupling structure 19 so as to be coupled to each other at the output side. The optical intensity modulator is featured in that optical signals branched off from each other in optical branching structure 18 are respectively subjected to phase modulation in first arm 15 and second arm 16, and in that, in the optical coupling structure, the modulated optical signals are then made to interfere with each other, so as to be converted into an optical intensity modulation signal.

In the present exemplary embodiment, optical branching structure 18 arranged at the input side branches an input optical signal into two optical signals for first and second arms 15 and 16 so that the optical signals have the same power. Here, a positive voltage is applied to first arm 15 via electrode pad 17, so that carriers are accumulated on both sides of dielectric layer 11 of the optical modulator, while a negative voltage is applied to second arm 16, so that carriers are depleted on both sides of dielectric layer 11 of the optical modulator. Thereby, the refractive index sensed by the optical signal electric field in the optical modulator is reduced in the carrier accumulation mode, and the refractive index sensed by the optical signal electric field is increased in the carrier depletion mode. As a result, the optical signal phase difference between the optical signals respectively transmitted through the arms is maximized. The optical signals respectively transmitted through the arms are multiplexed by the optical coupling structure on the output side, and thereby the optical intensity modulation is realized. It was confirmed that the Mach-Zehnder interferometer type optical intensity modulator using the optical modulator according to the present invention can transmit optical signals at 20 Gbps or more.

Further, when a plurality of the Mach-Zehnder interferometer type optical intensity modulators, each using the optical modulator according to the present invention, are arranged in parallel or in series with each other, the optical intensity modulators can also be applied to an optical modulator having a higher transfer rate, a matrix optical switch, and the like.

The present invention describes a rib waveguide structure, but the present invention with the rib shape can also be applied to a slab waveguide structure and the other waveguides.

This application claims the benefit of priority from Japanese Patent Application No. 2009-061526 filed in Japan on Mar. 13, 2009, the entire content of which is hereby incorporated by reference in the application and claims of the present application.

REFERENCE SIGNS LIST

2 embedded oxidized layer
3 substrate
4 $p^+$-doped semiconductor
6 electrode contact layer
7 oxide clad
8 p-doped semiconductor (first conductivity type semiconductor)
8' silicon layer
9 n-doped semiconductor (second conductivity type semiconductor)

11 dielectric layer
12 silicon oxide layer
14 n-doped wide gap semiconductor (second conductivity type transparent semiconductor)
15 first arm
16 second arm
17 electrode pad
18 optical branching structure
19 optical coupling structure
21 silicide
22 transparent electrode
23 metal electrode
24 contact hole
31 intrinsic semiconductor layer
32 embedded oxide layer
33 substrate
34 p$^+$-doped semiconductor
35 n$^+$-doped semiconductor
36 electrode contact layer
37 oxide clad
38 p-doped semiconductor
39 n-doped semiconductor
41 dielectric layer

The invention claimed is:

1. An optical modulator comprising at least:
a first conductivity type semiconductor layer;
a dielectric layer laminated on said first conductivity type semiconductor layer;
a second conductivity type semiconductor layer laminated on said dielectric layer;
a transparent electrode layer laminated on said second conductivity type semiconductor layer and optically transparent in at least a near-infrared wavelength region; and
a silicide layer provided between said second conductivity type semiconductor layer and said transparent electrode,
wherein the layer of said transparent electrode is formed by alternately arranging said transparent electrode and an insulator in a propagation direction of light,
wherein said propagation direction is perpendicular to a laminating direction of said first conductivity type semiconductor layer, said dielectric layer, said second conductivity type semiconductor layer, and said transparent electrode layer.

2. The optical modulator according to claim 1, wherein said transparent electrode is made of one of indium tin oxide, cadmium tin oxide, tin oxide, and zinc oxide.

3. The optical modulator according to claim 1, wherein, when the effective refractive index which is sensed by the signal electric field in the optical modulator is set as $n_{eff}$, when the optical signal wavelength is set as $\lambda$, and when the thickness of the region in which the carrier concentration is modulated is set as W, the value of 2W is equal to the value of $\lambda/n_{eff}$.

4. The optical modulator according to claim 1, wherein a region in which the optical signal electric field has peak intensity is arranged in a region which is located on each of both sides of said dielectric layer and which allows free carriers to be accumulated, depleted or inverted.

5. The optical modulator according to claim 1, wherein the region in which an optical signal is propagated has a rib waveguide structure or a slab waveguide structure.

6. An optical intensity modulator configured to use the optical modulator according to claim 1, the optical intensity modulator comprising
a Mach Zehnder interferometer structure including: a first arm and a second arm at each of which said optical modulator is arranged; an optical branching structure which is coupled to the input sides of said first arm and said second arm; and an optical coupling structure which is coupled to the output sides of said first arm and said second arm.

7. The optical intensity modulator according to claim 6, wherein said optical branching structure provides an input signal distribution ratio of 1:1 between said first arm and said second arm.

8. The optical intensity modulator according to claim 6, wherein a plurality of said Mach Zehnder interferometer structures are arranged in parallel or in series with each other.

9. A method for manufacturing an optical intensity modulator using the optical modulator according to claim 1,
wherein said optical modulator is arranged at each of a first arm and a second arm of a Mach Zehnder interferometer structure, wherein an optical branching structure is coupled to the input sides of said first arm and said second arm, and wherein an optical coupling structure is coupled to the output sides of said first arm and said second arm.

10. The method for manufacturing the optical intensity modulator according to claim 9, wherein said optical branching structure provides an input signal distribution ratio of 1:1 between said first arm and said second arm.

11. A method for manufacturing an optical modulator, comprising at least the steps of:
laminating, on a first conductivity type semiconductor layer, a second conductivity type semiconductor layer;
laminating, on said second conductivity type semiconductor layer, a silicide layer; and
laminating, on said silicide layer, a transparent electrode optically transparent in at least a near-infrared wavelength region,
wherein said transparent electrode and an insulator are alternately arranged as the layer of said transparent electrode in a propagation direction of light,
wherein said propagation direction is perpendicular to a laminating direction of said first conductivity type semiconductor layer, said dielectric layer, said second conductivity layer, said second conductivity type semiconductor layer, and said transparent electrode layer.

12. The method for manufacturing the optical modulator according to claim 11, wherein, when the effective refractive index which is sensed by the signal electric field in the optical modulator is set as $n_{eff}$, when the optical signal wavelength is set as $\lambda$, and when the thickness of the region in which the carrier concentration is modulated is set as W, the value of 2W is equal to the value of $\lambda/n_{eff}$.

13. The method for manufacturing the optical modulator according to claim 11, wherein a region in which the optical signal electric field has peak intensity is arranged in a region which is located on each of both sides of said dielectric layer and which allows free carriers to be accumulated, depleted or inverted.

14. The method for manufacturing the optical modulator according to claim 11 wherein a rib waveguide structure or a slab waveguide structure is formed in the region in which an optical signal is propagated.

* * * * *